US010660024B2

(12) United States Patent
Zhang et al.

(10) Patent No.: US 10,660,024 B2
(45) Date of Patent: May 19, 2020

(54) WIRELESS NETWORK ACCESS METHOD AND APPARATUS

(71) Applicant: TENCENT TECHNOLOGY (SHENZHEN) COMPANY LIMITED, Shenzhen, Guangdong (CN)

(72) Inventors: Shanwan Zhang, Shenzhen (CN); Longfei Li, Shenzhen (CN); Wenping Shi, Shenzhen (CN); Jinlong Shen, Shenzhen (CN); Dabin Zhuang, Shenzhen (CN); Zhengwen Xiong, Shenzhen (CN); Hongxi Pan, Shenzhen (CN); Linfeng Chen, Shenzhen (CN); Ningbo Li, Shenzhen (CN); Peihong Huang, Shenzhen (CN); Zheng Fan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/572,698

(22) PCT Filed: Jun. 15, 2016

(86) PCT No.: PCT/CN2016/085774
§ 371 (c)(1),
(2) Date: Nov. 8, 2017

(87) PCT Pub. No.: WO2017/020654
PCT Pub. Date: Feb. 9, 2017

(65) Prior Publication Data

US 2018/0132167 A1 May 10, 2018

(30) Foreign Application Priority Data

Jul. 31, 2015 (CN) .......................... 2015 1 0466272

(51) Int. Cl.
*H04W 48/16* (2009.01)
*H04W 12/06* (2009.01)
(Continued)

(52) U.S. Cl.
CPC ............. *H04W 48/16* (2013.01); *H04L 63/08* (2013.01); *H04L 63/10* (2013.01); *H04W 12/06* (2013.01);
(Continued)

(58) Field of Classification Search
None
See application file for complete search history.

(56) References Cited

U.S. PATENT DOCUMENTS 9,763,247 B2 * 9/2017 Sidhu ................ H04W 72/0453
2008/0049702 A1 * 2/2008 Meylan ................. H04W 48/20
370/342
(Continued)

FOREIGN PATENT DOCUMENTS

CN 102685750 A 9/2012
CN 103281752 A 9/2013
(Continued)

OTHER PUBLICATIONS

International Search Report of PCT/CN2016/085774 dated Aug. 24, 2016.
(Continued)

*Primary Examiner* — Joseph A Bednash
(74) *Attorney, Agent, or Firm* — Sughrue Mion, PLLC

(57) ABSTRACT

A wireless network access method and apparatus are provided. The method includes obtaining identification information and status information of one or more network access points, determining a target access point according to the status information, submitting the identification information of the target access point to a network access server
(Continued)

Obtain identification information of at least one available network access point — S101

Obtain access point status information of each available network access point — S102

Determine a target access point from the at least one available network access point according to the access point status information — S103

Submit the identification information of the target access point to a network access server — S104

Receive access account information for the target access point from the network access server — S105

Send a wireless network access request to the target access point by using the access account information — S106 via a mobile communications network, receiving access account information for the target access point from the network access server, and transmitting a wireless network access request including the received access account information, to the target access point.

22 Claims, 7 Drawing Sheets

(51) Int. Cl.
*H04W 48/14* (2009.01)
*H04W 48/00* (2009.01)
*H04W 48/20* (2009.01)
*H04L 29/06* (2006.01)
*H04W 88/10* (2009.01)

(52) U.S. Cl.
CPC .......... *H04W 48/14* (2013.01); *H04W 48/17* (2013.01); *H04W 48/20* (2013.01); *H04W 88/10* (2013.01)

(56) References Cited

U.S. PATENT DOCUMENTS

2009/0111485 A1* 4/2009 Kitani .................. H04W 48/18 455/456.1
2012/0096519 A1* 4/2012 Alanara ................ H04L 63/123 726/3
2012/0310941 A1* 12/2012 MacDonald .......... G06F 16/958 707/740
2013/0058274 A1* 3/2013 Scherzer ............... H04L 63/107 370/328
2015/0351096 A1* 12/2015 Sidhu ................ H04W 72/0453 370/329
2016/0134613 A1 5/2016 Rong et al.

FOREIGN PATENT DOCUMENTS

CN 104350802 A 2/2015
CN 104735727 A 6/2015
CN 105050048 A 11/2015
CN 105163368 A 12/2015
EP 2 480 031 A1 7/2012

OTHER PUBLICATIONS

International Search Authority and Translation of Written Opinion, dated Aug. 24, 2016 from the International Bureau in counterpart International application No. PCT/CN2016/085774
Communication dated Jan. 21, 2019 from the State Intellectual Property Office of the P.R.C. in application No. 201510466272.5.
Communication dated Jul. 10, 2018 from the State Intellectual Property Office of the P.R.C. in application No. 201510466272.5

* cited by examiner

WIRELESS NETWORK ACCESS METHOD AND APPARATUS

CROSS REFERENCE TO RELATED APPLICATIONS

This is a National Stage of International Application No. PCT/CN2016/085774 filed Jun. 15, 2016, claiming priority to Chinese Patent Application No. 201510466272.5, entitled "Wireless Network Access Method and Apparatus" filed on Jul. 31, 2015 in the State Intellectual Property Office, the contents of all of which are incorporated herein by reference in their entirety.

FIELD

Apparatuses, devices, and methods consistent with the present disclosure relate to the field of network technology, and in particular, to a wireless network access method and a network terminal implementing the wireless network access method.

DESCRIPTION OF RELATED ART

With the development of wireless network technologies, mobile communications terminals have gradually become major network information terminals due to portability, and mass users access, by using the mobile communications terminals, the Internet to obtain information. One method of accessing a wireless network and the Internet is by Wireless Fidelity (WiFi) access point. WiFi is a collection of technologies supporting local area wireless network communication under the IEEE 802.11 protocol suite.

In the related art technology, a mobile communications terminal is granted access to a WiFi access point after a user enters a password of the WiFi access point, and some public access points can be used after the user performs registration and enters an account for login. The automation degree of using a WiFi access point is low, and the access is inconvenient for use. Consequently, promotion of public WiFi access point services is seriously affected.

SUMMARY

It is an aspect to provide a wireless network access method and apparatus, so that a network terminal may obtain access account information of a network access point quickly, and use the access account information to access the network access point.

According to one or more exemplary embodiments, there is provided a wireless network access method performed by a network terminal, the wireless network access method comprising obtaining, by at least one central processing unit (CPU), identification information of at least one available network access point; obtaining, by the at least one CPU, access point status information of each of the at least one available network access point; determining, by the at least one CPU, a target access point from the at least one available network access point according to the access point status information; submitting, by the at least one CPU, the identification information of the target access point to a network access server via a mobile communications network; receiving, by the at least one CPU, access account information for the target access point from the network access server; and transmitting, by the at least one CPU, a wireless network access request including the received access account information, to the target access point.

According to one or more exemplary embodiments, there is provided a network terminal comprising a memory that stores a plurality of modules and at least one central processing unit (CPU) configured to execute the plurality of modules, the plurality of modules including an identification information obtaining module, configured to obtain identification information of at least one available network access point; a status information obtaining module, configured to obtain access point status information of each of the at least one available network access point; an access point determining module, configured to determine a target access point from the at least one available network access point according to the access point status information; an identification submission module, configured to submit the identification information of the target access point to a network access server via a mobile communications network; an access account obtaining module, configured to receive access account information for the target access point from the network access server; and a network access module, configured to transmit a wireless network access request including the received access account information, to the target access point.

According to one or more exemplary embodiments, there is provided a non-transitory computer readable medium storing program code which when executed by a computer causes the computer to execute a process comprising obtaining identification information of at least one available network access point; obtaining access point status information of each of the at least one available network access point; determining a target access point from the at least one available network access point according to the access point status information; submitting the identification information of the target access point to a network access server via a mobile communications network; receiving access account information for the target access point from the network access server; and transmitting a wireless network access request including the received access account information, to the target access point.

According to one or more exemplary embodiments, there is provided a wireless network access method performed by a network terminal, the wireless network access method comprising obtaining, by at least one central processing unit (CPU), status information from one or more Wireless Fidelity (WiFi) access points within a wireless transmission range of the network terminal; selecting, by the at least one CPU, a target WiFi access point from the one or more WiFi access points, based on the status information; transmitting, by the at least one CPU, identification information of the target WiFi access point to a network access server via a mobile communications network; in response to transmitting the identification information, receiving, by the at least one CPU, access information for the target WiFi access point from the network access server; and accessing, by the at least one CPU, a WiFi network via the target WiFi access point using the access information.

BRIEF DESCRIPTION OF THE DRAWINGS

The above and other aspects will become apparent from the following description of exemplary embodiments, with reference to the accompanying drawings in which.

DESCRIPTION OF EXEMPLARY EMBODIMENTS

The following clearly and completely describes exemplary embodiments with reference to the accompanying drawings in which various exemplary embodiments are shown. The described exemplary embodiments are merely illustrative, and other exemplary embodiments may be obtained by a person of ordinary skill in the art based on the exemplary embodiments described herein and all such exemplary embodiments fall within the protection scope of the claims provided herein.

Figure 1:
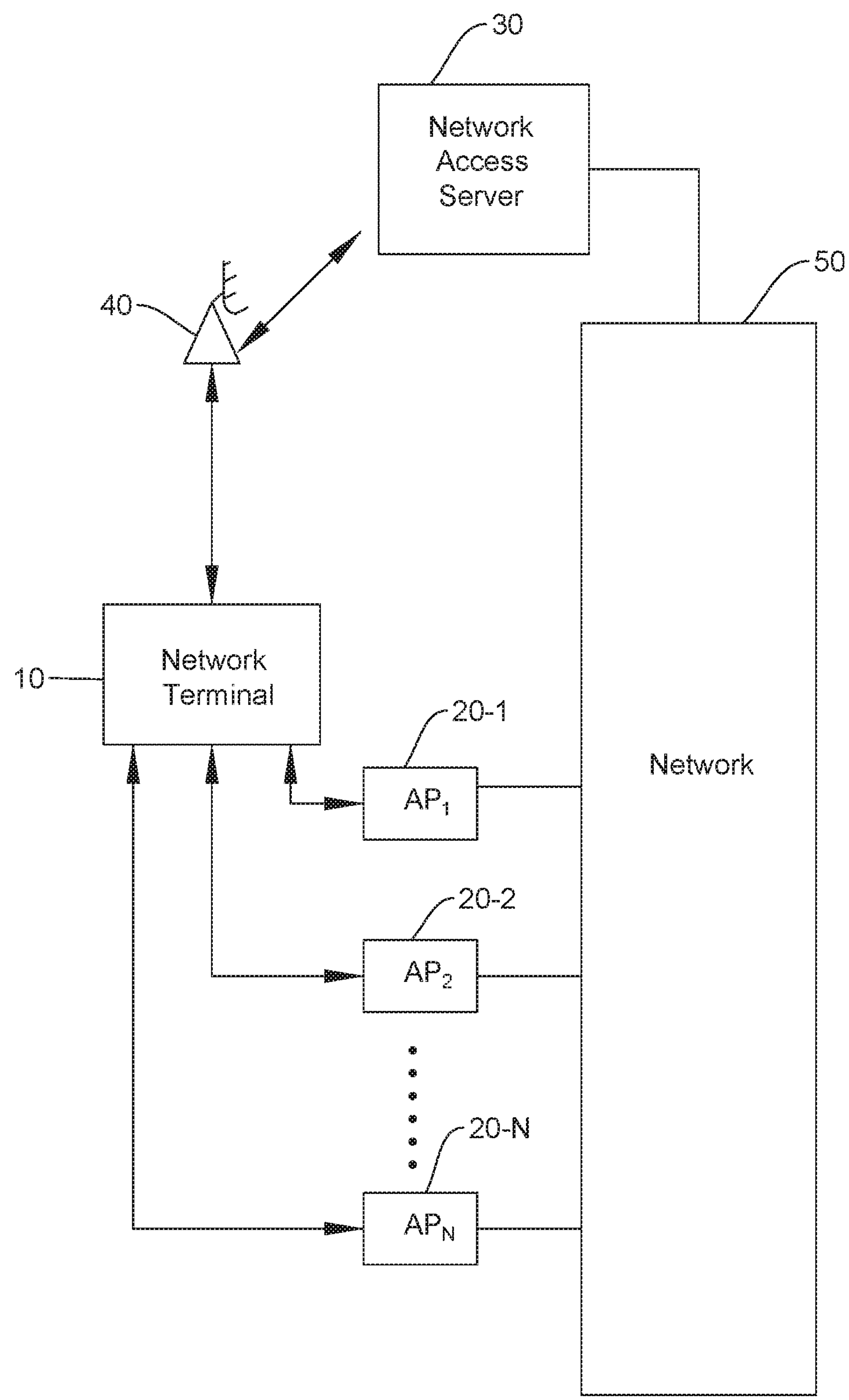
FIG. 1 shows an example of an environment in which a network terminal according to exemplary embodiment is used.

FIG. 1 shows an example of an environment in which a network terminal according to exemplary embodiment is used A network terminal 10 accesses a network 50. The network terminal 50 may be a personal computer, a smartphone, a tablet computer, a notebook computer, an in-vehicle terminal, or a portable wearable device, etc. The network terminal 10 may access the network 50 in several manners. One manner is to access the network 50 via a mobile communications data network provided by a mobile communications operator. For example, the network terminal 10 may access a network access server 30 through a base station 40 provided by a mobile communication operator. The base station 40 may be on a mobile communications data network that is the same as or separate from the network 50. In the case where the mobile communications data network is separate from network 50, the mobile communications data network may be connected to the network 50 by one or more gateway/routers (not shown). The network 50 may be the Internet. Another manner is to access the network 50 using a Wireless Fidelity (WiFi) access point. For example, the network terminal 10 may access the network 50 via one or more access points (APs) 20. The access points (APs) may be provided as a plurality of access points AP 20-1, AP 20-2, . . . , AP 20-N. Generally, when the network terminal 10 accesses the network 50 via an access point AP 20, there is an advantage in that the access has a faster speed and a lower cost than accessing the network via the mobile communications data network.

However, as discussed above, accessing the network 50 via an access point (AP) 20 has some disadvantages. For example, in the case of a private AP, a user must enter account information, such as a user name and password, each time the access point (AP) 20 is accessed before the user may access and use the network 50. Even in the case of a public access point, the user must usually register an email address or other information before access to the network 50 may occur.

Exemplary embodiments improve on related art network technology by providing a method and apparatus to obtain access account information of a network access point quickly, and to use the access account information to access the network access point. According to one or more exemplary embodiments, a network terminal 10 obtains account information for a target access point AP via a network access server 30 provided on a mobile communications data network and uses the obtained account information to access the network 50 via the target access point AP.

Figure 2:
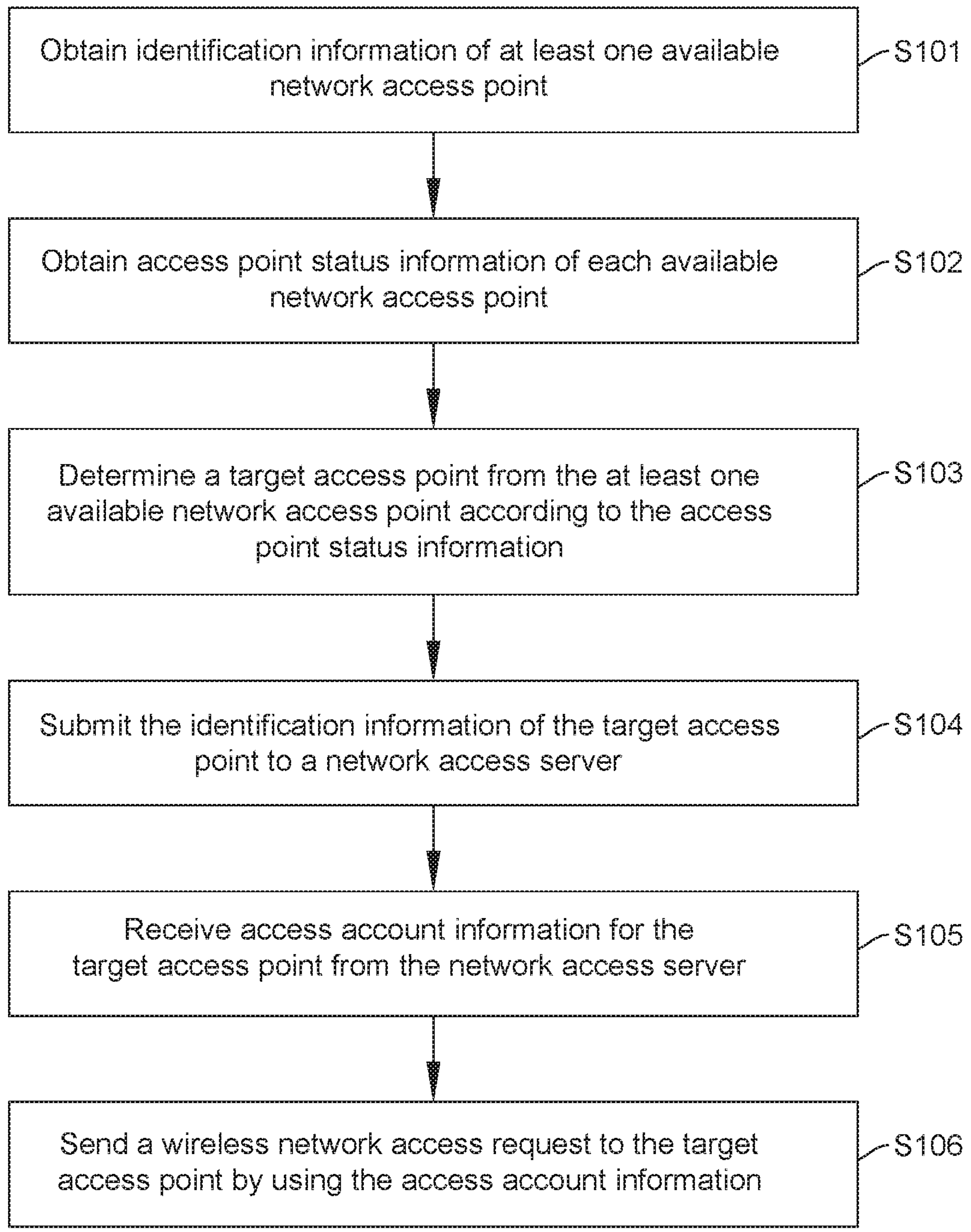
FIG. 2 is a schematic flowchart of a wireless network access method according to an exemplary embodiment.

FIG. 2 is a schematic flowchart of a wireless network access method according to an exemplary embodiment. As shown in FIG. 2, a process of the wireless network access method may include the following operations:

S101. Obtain identification information of at least one available network access point according to a wireless network access signal that is currently found.

Specifically, after a wireless network access function (for example, WiFi function) is enabled, a network terminal may automatically search for wireless network access signals. If there is a network access point nearby, the network access point may broadcast a wireless network access signal. The wireless network access signal may include identification information of the access point, and the identification information may solely identify a network access function provider, for example, a service set identifier (SSID). In some exemplary embodiments, the wireless network access signal may also include a MAC address of a device network adapter of the access point, to distinguish different network access function providers having a same SSID. Because wireless network access signals transmitted by one or more access points may be found at the same time, the identification information obtaining module 410 may obtain identification information of at least one available network access point according to the wireless network access signals that are currently found. When a wireless network access signal transmitted by a network access point is found, it may be confirmed that the network access point is an available network access point. In some exemplary embodiments, the network terminal may perform filtering and screening on the found network access points, to exclude a specified network access point. For network access points corresponding to the found wireless network access signals, the network terminal determines that only an access point satisfying a threshold condition is an available network access point. For example, the network terminal may perform filtering and screening on the found network access points by setting a black/white list or setting a status threshold.

In some exemplary embodiments, the wireless network access process according to an exemplary embodiment may be triggered after a user starts the network terminal according to an exemplary embodiment. In some exemplary embodiments, the wireless network access process may be triggered by an available network access point that is found by the network terminal during operation, or may be triggered by a network access instruction entered by the user.

S102. Obtain access point status information of each available network access point.

Specifically, the access point status information may include one or more of a wireless network access signal strength of the network access point, a network speed, or a distance between a network terminal where the wireless access point is located and the available network access point.

Because a wireless network access signal transmitted by an access point may be affected by a transmission distance and an environment, the strength of the wireless network access signal received at different locations may be different. Therefore, a received wireless network access signal strength of each available network access point may be instantly measured, and the strengths may be used as the access point status of the available network access point.

The network speed represents a network speed of assessing the Internet by using the network access point. The network speed may be obtained by the network terminal by currently performing instant detection, may be determined according to a reference speed carried in the wireless network access signal broadcast by the network access point, or may be a network speed of the corresponding available network access point that is prestored in a network access server and that is obtained by the network terminal from the network access server according to the identification information of the network access point.

The network terminal obtains the distance between the network terminal and the available network access point. For example, the network terminal may obtain by a built-in positioning module (for example, a Global Positioning System (GPS)) of the network terminal, current location information of the network terminal, and obtain, according to the identification information of the available network access point, location information that is prestored by the network access server and that corresponds to the available network access point, and determine the distance between the network terminal and the available network access point based on the obtained current location and the obtained location information. For example, the network terminal may send identification information of a network access point to the network access server. The network access server searches, according to the identification information, prestored location information of each network access point for the location information corresponding the network access point, and returns the location information to the network terminal. The network terminal calculates a distance between a network terminal where the network terminal is located and the corresponding network access point with reference to the location information of the network terminal. For another example, the network terminal may send a distance information request to the network access server. The request includes location information of a network terminal where the network terminal is located and identification information of an available network access point. The network access server searches, according to the identification information, prestored location information of each network access point for the location information corresponding the network access point, calculates a distance between the network terminal and the available network access point, and returns the distance to the network terminal.

S103. Determine a target access point from the at least one available network access point according to the access point status information of the available network access point.

In some exemplary embodiments, the network terminal may display the available network access point in a form of collections or a list to the user, and simultaneously display the access point status information of each available network access point, so that the user selects the target access point. In some exemplary embodiments, the network terminal may automatically determine the target access point from the at least one available network access point according to the access point status information of the available network access point. For example, the network terminal determines, by comparing the access point status information of a plurality of available network access points, an available network access point having a best access quality as the target access point.

S104. Submit the identification information of the target access point to a network access server.

S105. Receive access account information returned by the network access server according to the identification information of the target access point.

Specifically, the network access server collects access account information of multiple network access points in advance, and stores the collected access account information and the identification information of the corresponding access points in an associated manner. After receiving the identification information of the target access point submitted by the network terminal, the network access server may search, according to the identification information of the target access point, the access account information corresponding to the network access points, and return the access account information to the network terminal. The access account information may include an access account (for example, a user name) and corresponding access verification information (for example, a login password). In some exemplary embodiments, the access account information may alternatively include only a login password corresponding to the target access point.

S106. Send a wireless network access request to the target access point by using the access account information.

In some exemplary embodiments, the network terminal may send, according to access account information obtained by the network access server, to the target access point, a wireless network access request including the access account information. After receiving the wireless network access request, the target access point verifies whether the access account information included in the request is legal. If yes, the target access point allows a network terminal where the network terminal is located to access a network by using the target access point. If no, the access is denied. In some exemplary embodiments, the network terminal may access a login page corresponding to the target access point, and submit the access account information obtained from the network access server to the target access point by using the login page. After receiving the wireless network access request, the target access point verifies whether the access account information included in the request is legal. If yes, the target access point allows a network terminal where the network terminal is located to access a network by using the target access point. If not, the access is denied.

According to exemplary embodiments described above, access point status information of each available network access point that is currently found is obtained, a target access point is determined in the at least one available network access point, and access account information of the target access point is further obtained from a network access server, to implement rapid network access.

Figure 3:
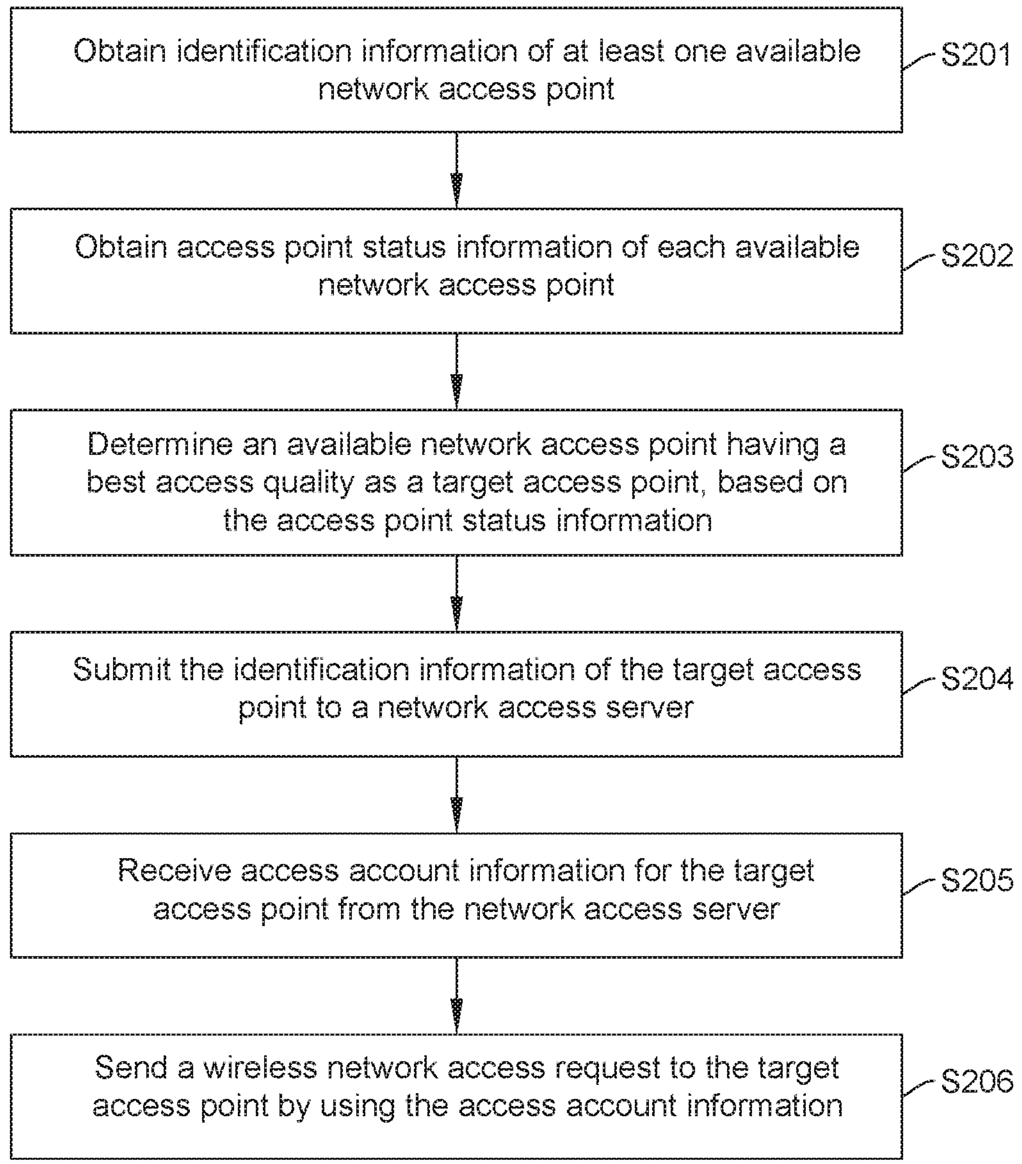
FIG. 3 is a schematic flowchart of a wireless network access method according to another exemplary embodiment.

FIG. 3 is a schematic flowchart of a wireless network access method according to another exemplary embodiment. As shown in FIG. 3, the wireless network access method may include the following operations:

S201. Obtain identification information of at least one available network access point according to a wireless network access signal that is currently found.

Operation S201 is similar to operation S101 described above, and therefore repeated description thereof is omitted for conciseness.

S202. Obtain access point status information of each available network access point.

Operation S202 is similar to operation S102 described above, and therefore repeated description thereof is omitted for conciseness.

S203. Determine, by comparing the access point status information of the at least one available network access point, an available network access point having a best access quality as a target access point.

In some exemplary embodiments, a user does not need to participate in selecting the target access point, and the network terminal automatically selects the target access point for a network terminal according to the access point status information of the at least one available network access point. The access point status information may include one or more of a wireless network access signal strength of the network access point, a network speed, or a distance between the network terminal and the available network access point.

In some exemplary embodiments, the network terminal may set weight values corresponding to the wireless network access signal strength, the network speed, and/or the distance. The network terminal may determine an access quality reference value for each of the available network access points based on the wireless network access signal strength, the network speed, and/or the distance and their corresponding set weight values, and determine an available network access point having a best access quality by comparing the access quality reference value of each available network access point, and selecting an available network access point having a best access quality as the target access point. For example, in some exemplary embodiments, the network terminal may select an available network access point having a highest access quality reference value as the target access point.

In some exemplary embodiments, the network terminal may set an access quality parameter threshold, and exclude some network access points that do not satisfy the quality parameter threshold before determining the target access point. For example, the network terminal may set a wireless network access signal strength threshold, a network speed threshold, and/or a distance threshold, so that the network terminal reduces a number of the available network access points, and automatically selects the target access point for the network terminal according to the access point status information of each available network access point. This excluding some network access points may also be used with other exemplary embodiments described above. For example, in some exemplary embodiments, the shortened list of network access points may be presented to the user for selection by the user as described above.

S204. Submit the identification information of the target access point to a network access server. Operation S204 is similar to operation S104 described above, and therefore repeated description thereof is omitted for conciseness S205. Receive access account information returned by the network access server according to the identification information of the target access point. Operation S205 is similar to operation S105 described above, and therefore repeated description thereof is omitted for conciseness S206. Send a wireless network access request to the target access point by using the access account information. Operation S206 is similar to operation S106 described above, and therefore repeated description thereof is omitted for conciseness According to the exemplary embodiment shown in FIG. 3, the network terminal may obtain access point status information of each available network access point that is currently found, determine an available network access point having a best access quality as a target access point, and obtain access account information of the target access point from the network access server.

Figure 4:
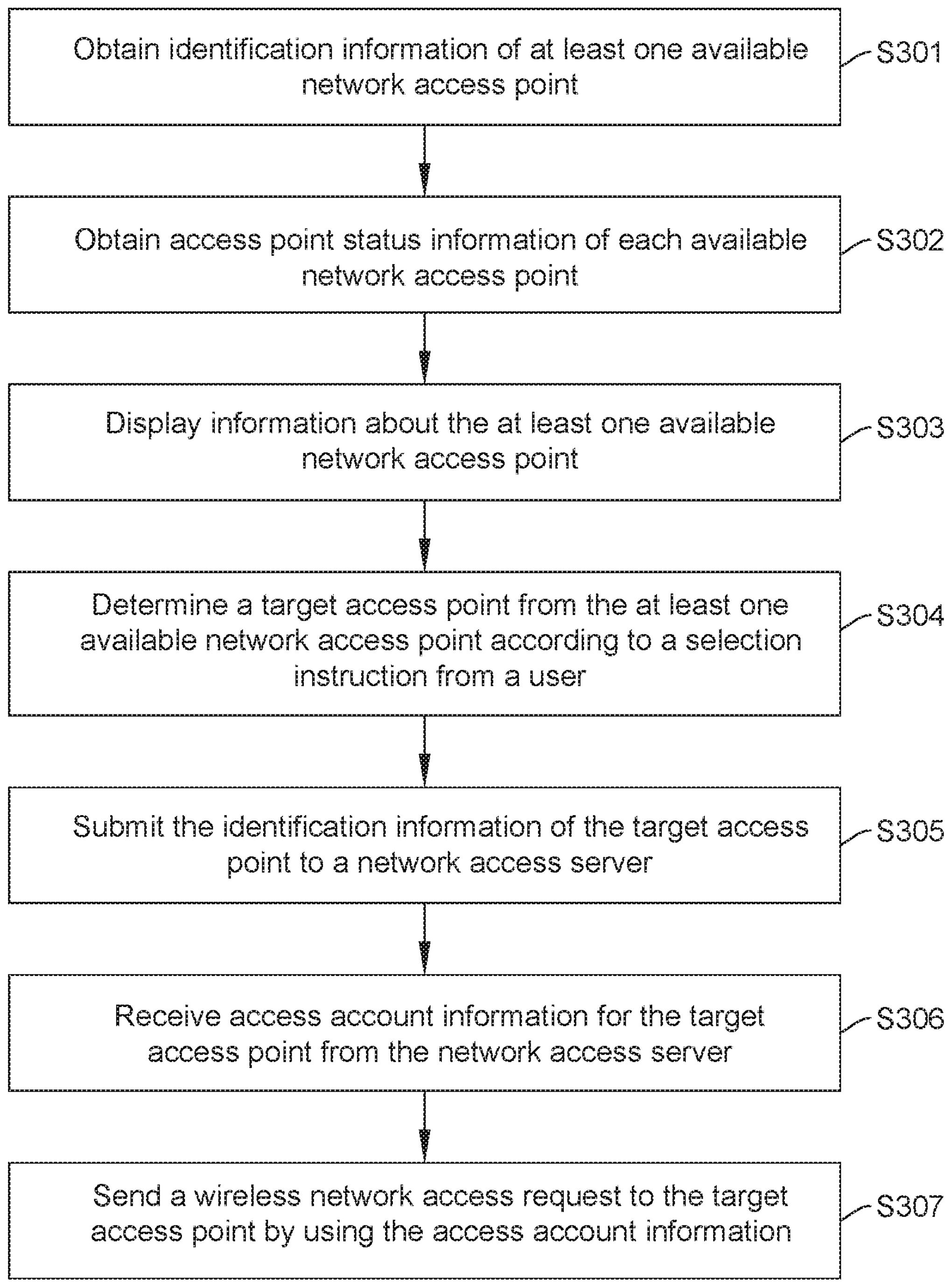
FIG. 4 is a schematic flowchart of a wireless network access method according to another exemplary embodiment.

FIG. 4 is a schematic flowchart of a wireless network access method according to another exemplary embodiment. As shown in FIG. 4, a process of the wireless network access method may include the following operations:

S301. Obtain identification information of at least one available network access point according to a wireless network access signal that is currently found. Operation S301 is similar to operation S101 described above, and therefore repeated description thereof is omitted for conciseness Operation S301 is similar to operation S101 described above, and therefore repeated description thereof is omitted for conciseness.

S302. Obtain access point status information of each available network access point.

Operation S302 is similar to operation S102 described above, and therefore repeated description thereof is omitted for conciseness.

S303. Display information about the available network access point, where the information about the available network access point includes the identification information of the at least one available network access point and the corresponding access point status information.

In some exemplary embodiments, the network terminal may display the found available network access point(s) to a user in a form of collections or a list, and simultaneously display the access point status information of each of the available network access point(s), to facilitate the user's understanding of access quality of surrounding available network access point(s).

In some exemplary embodiments, a display order of the at least one available network access point is sorted according to the access point status information of the available network access point. Thus, a user may easily understand an available network access point having better network quality, so that the user may select the available network access point having the best access quality as the target access point. In some exemplary embodiments, the network terminal may set weight values corresponding to one or more of the wireless network access signal strength, the network speed, and/or the distance, and determine an access quality reference value of each available network access point based on the wireless network access signal strength, the network speed, and/or the distance and their corresponding set weights to determine an available network access point having better access quality by comparing the access quality reference value of each available network access point. In some exemplary embodiments, the network terminal may set an access quality parameter threshold, to exclude some network access points that do not satisfy the quality parameter threshold before determining the target access point. For example, the network terminal may set one or more of a wireless network access signal strength threshold, a network speed threshold, and/or a distance threshold, so that the network terminal may reduce a number of the available network access points, and display information for the reduced number of available network access points.

S304. Determine the target access point from the at least one available network access point according to an access point selection instruction entered by a user.

For example, the user selects one available network access point from the collections or the list of the available network access point(s) displayed by the network terminal as the target access point.

S305. Submit the identification information of the target access point to a network access server. Operation S305 is similar to operation S104 described above, and therefore repeated description thereof is omitted for conciseness S306. Receive access account information returned by the network access server according to the identification information of the target access point. Operation S306 is similar to operation S105 described above, and therefore repeated description thereof is omitted for conciseness S307. Send a wireless network access request to the target access point by using the access account information. Operation S307 is similar to operation S106 described above, and therefore repeated description thereof is omitted for conciseness According to the exemplary embodiment shown in FIG. 4, the network terminal may obtain access point status information of each available network access point that is currently found, display the available network access point (s) and the corresponding access point status information to the user, so that the user rapidly may select an available network access point having a best access quality as a target access point, obtain access account information of the selected target access point from the network access server, and thereby implement a rapid network access.

Figure 5:
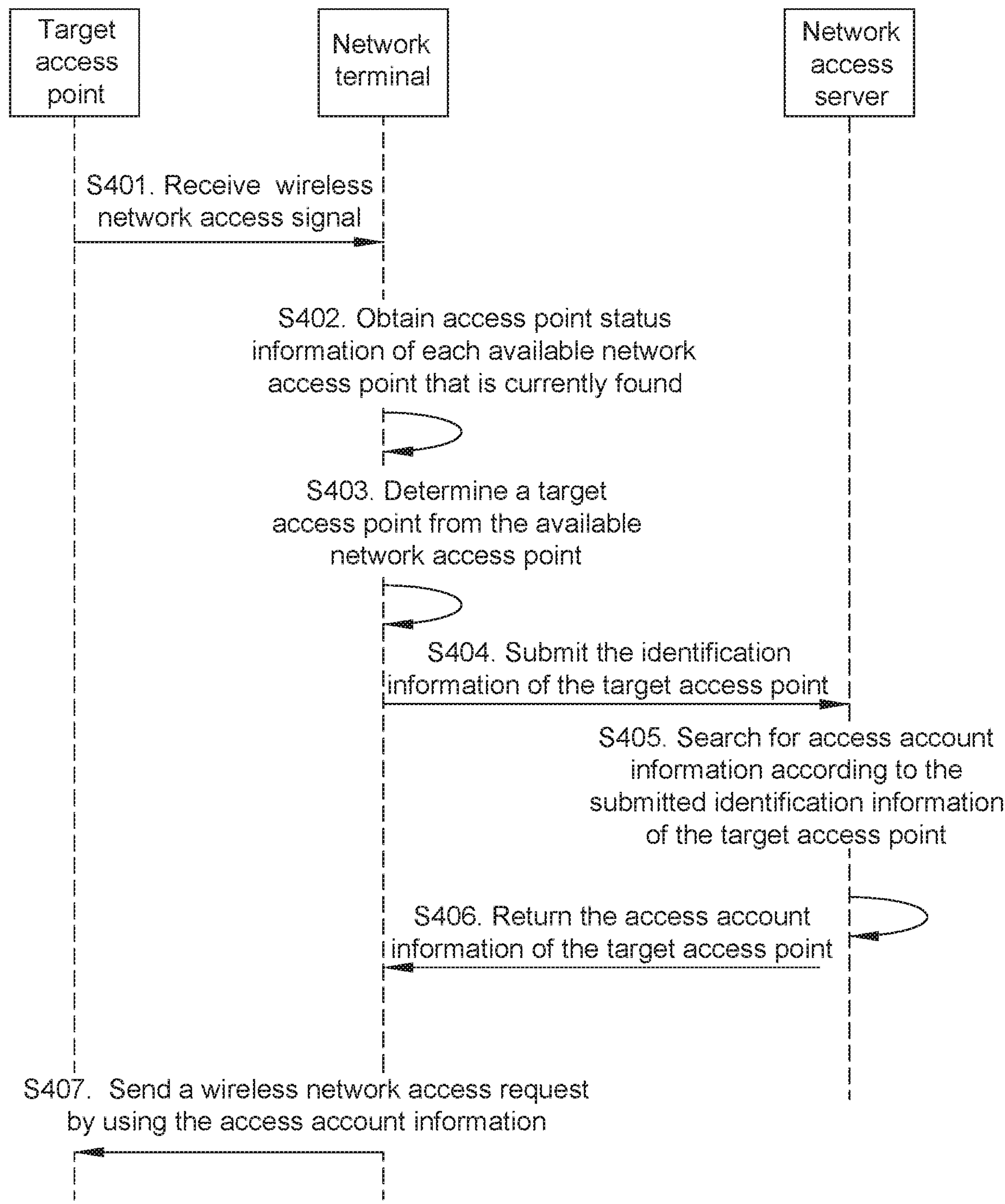
FIG. 5 is a schematic flowchart of a wireless network access method according to still another exemplary embodiment.

FIG. 5 is a schematic flowchart of a wireless network access method according to still another exemplary embodiment. As shown in FIG. 5, the wireless network access method may include the following processes:

S401. A network terminal receives a wireless network access signal sent by a network access point.

Specifically, after a wireless network access function (for example, a WiFi function) is enabled, the network terminal may automatically search for and find wireless network access signals. If there is a network access point nearby, the network access point may broadcast a wireless network access signal. The wireless network access signal may include identification information of the network access point from which the wireless network access signal is broadcast, and the identification information may solely identify a network access function provider, for example, a service set identifier (SSID). The wireless network access signal may also include a MAC address of a device network adapter of the network access point, to distinguish different network access function providers having a same SSID. Operation S401 is similar to operation S101 described above.

S402. The network terminal obtains access point status information of each available network access point that is currently found.

Specifically, the access point status information may include one or more of a wireless network access signal strength of the network access point, a network speed, and/or a distance between the network terminal and the available network access point. Operation S402 is similar to operation S102 described above.

S403. The network terminal determines a target access point from the available network access point according to access status information of each available network access point.

The network terminal may display the one or more available network access points in a form of collections or a list to a user, and simultaneously display the access point status information of each available network access point, so that a user may select the target access point. In some exemplary embodiments, the network terminal may automatically determine a target access point from the one or more available network access points according to the access point status information of the one or more available network access points. For example, the network terminal may determine, by comparing the access point status information of the one or more available network access points, an available network access point having a best access quality as the target access point. Operation S403 is similar to operation S103 described above.

S404. Submit the identification information of the target access point to a network access server. Operation S404 is similar to operation S104 described above.

S405. The network access server searches for access account information corresponding to the network access point according to the submitted identification information of the target access point.

Specifically, the network access server collects access account information of multiple network access points in advance, and stores the collected access account information and the identification information of the corresponding access points in an associated manner. After receiving the identification information of the target access point submitted by the network terminal, the network access server may search for the access account information corresponding to the network access point according to the identification information of the target access point. For example, the access account information may include an access account (for example, a user name) and corresponding access verification information (for example, a login password). In some exemplary embodiments, the access account information may include only a login password corresponding to the target access point.

S406. The network access server may return the access account information of the target access point to the network terminal. Operation S406 is similar to operation S105 described above.

S407. The network terminal sends a wireless network access request to the target access point using the received access account information. Operation S407 is similar to operation S106 described above.

In some exemplary embodiments, the network terminal may send, according to access account information obtained by and received from the network access server, to the target access point, a wireless network access request including the access account information. After receiving the wireless network access request, the target access point verifies whether the access account information included in the request is legal. If yes, the target access point allows the network terminal to access a network by using the target access point. If no, the target access point denies the request and does not allow the network terminal to access the network using the target access point. In some exemplary embodiments, the network terminal may access a login page corresponding to the target access point, and submit the access account information obtained from the network access server to the target access point by using the login page. After receiving the wireless network access request, the target access point verifies whether the access account information carried in the request is legal. If yes, the target access point allows the network terminal to access a network by using the target access point. If no, the target access point denies the request and does not allow the network terminal to access the network using the target access point.

According to the exemplary embodiment shown in FIG. 5, access point status information of each available network access point that is currently found is obtained, a target access point is determined from the available network access points, and access account information of the target access point is obtained from a network access server, to implement rapid network access.

Figure 6:
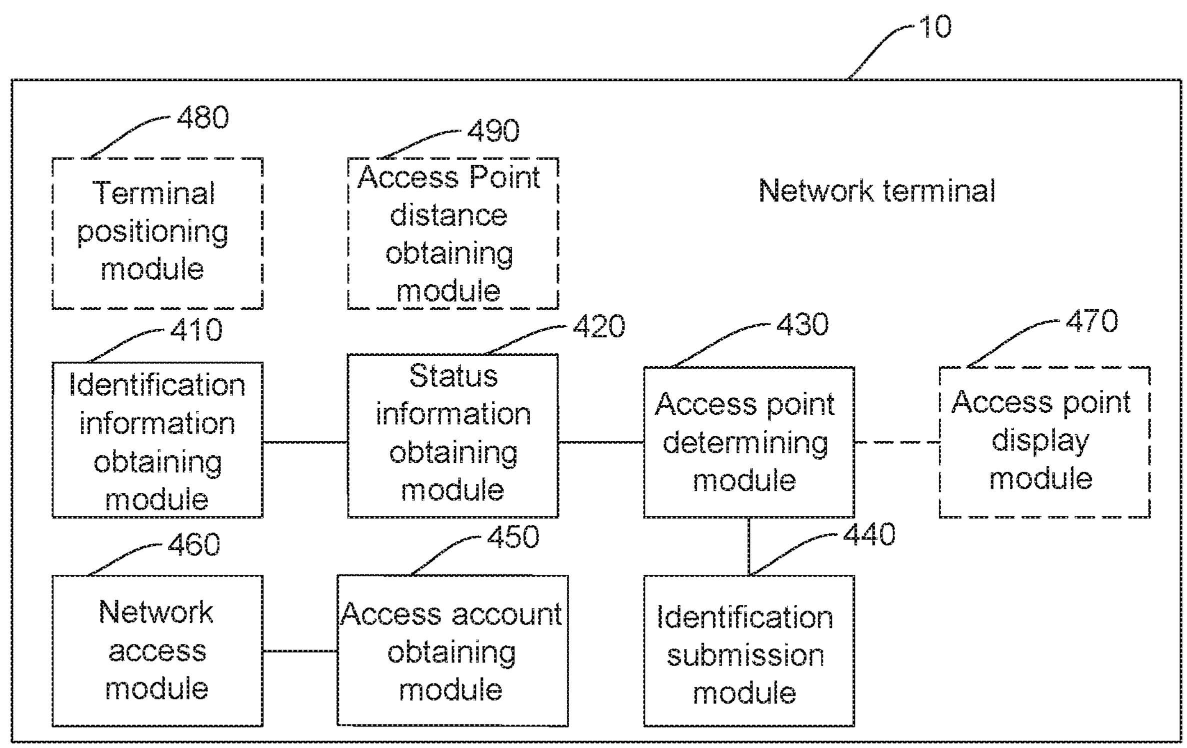
FIG. 6 is a schematic structural diagram of a network terminal according to an exemplary embodiment.

FIG. 6 is a schematic structural diagram of a network terminal according to an exemplary embodiment. As shown in FIG. 6, the network terminal may include an identification information obtaining module 410, a status information obtaining module 420, an access point determining module 430, an identification submission module 440, an access account obtaining module 450, and a network access module 460.

The identification information obtaining module 410 is configured to obtain identification information of at least one available network access point according to a wireless network access signal that is currently found.

Specifically, after a wireless network access function (for example. WiFi function) is enabled, a network terminal may automatically search for wireless network access signals. If there is a network access point nearby, the network access point may broadcast a wireless network access signal. The wireless network access signal may include identification information of the access point, and the identification information may solely identify a network access function provider, for example, a service set identifier (SSID). In some exemplary embodiments, the wireless network access signal may also include a MAC address of a device network adapter of the access point, to distinguish different network access function providers having a same SSID. Because wireless network access signals transmitted by one or more access points may be found at the same time, the identification information obtaining module 410 may obtain identification information of at least one available network access point according to the wireless network access signals that are currently found. When a wireless network access signal transmitted by a network access point is found, it may be confirmed that the network access point is an available network access point. In some exemplary embodiments, the network terminal may perform filtering and screening on the found network access points, to exclude a specified network access point. For network access points corresponding to the found wireless network access signals, the network terminal determines that only an access point satisfying a threshold condition is an available network access point. For example, the network terminal may perform filtering and screening on the found network access points by setting a blank/white list or setting a status threshold.

In some exemplary embodiments, a user may trigger wireless network access service of the network terminal by starting the network terminal. In some exemplary embodiments, the wireless network access service may be triggered by using an available network access point that is found by the network terminal during operation, or may be triggered by a network access instruction entered by the user.

The status information obtaining module 420 is configured to obtain access point status information of each available network access point.

Specifically, the access point status information may include one or more of a wireless network access signal strength of the network access point, a network speed, and/or a distance between the network terminal and the available network access point.

Because a wireless network access signal transmitted by an access point may be affected by a transmission distance and environment, a strength of the wireless network access signal received at different locations may be different. Therefore, the status information obtaining module 420 may be configured to instantly measure a received wireless network access signal strength of each available network access point, and the signal strengths may be used as the access point status of the available network access point.

The network speed represents a network speed of assessing the Internet by using the network access point. The network speed may be obtained by the status information obtaining module 420 by currently performing instant detection, may be determined by the status information obtaining module 420 according to a reference speed included in the wireless network access signal broadcast by the network access point, or may be a network speed of the corresponding available network access point that is prestored in a network access server and that is obtained by the status information obtaining module 420 from the network access server according to the identification information of the network access point.

The status information obtaining module 420 obtains the distance between the network terminal and the available network access point. For example, the status information obtaining module 420 may obtain current location information of the network terminal, obtain, according to the identification information of the available network access point, the location information that is prestored by the network access server and that corresponds to the available network access point, and determine the distance between the network terminal and the available network access point based on the current location information and the location information. For example, the status information obtaining module 420 may send identification information of a network access point to the network access server. The network access server may search, according to the received identification information, prestored location information of each network access point for the location information corresponding the network access point, and return the location information to the status information obtaining module 420. The status information obtaining module 420 may determine a distance between a network terminal where the status information obtaining module 420 is located and the network access point with reference to location information of the network terminal. For another example, the status information obtaining module 420 may send a distance information request to the network access server. The request includes location information of a network terminal where the status information obtaining module 420 is located and identification information of an available network access point. The network access server may search, according to the identification information, prestored location information of each network access point for the location information corresponding the network access point, determine a distance between the network terminal and the available network access point, and return the distance to the status information obtaining module 420.

The access point determining module 430 is configured to determine a target access point from the at least one available network access point according to the access point status information of the available network access point.

In some exemplary embodiments, the access point determining module 430 may display the available network access point in a form of collections or a list to the user, and simultaneously display the access point status information of each available network access point, so that the user may select the target access point. In some exemplary embodiments, the access point determining module 430 may automatically determine the target access point from the at least one available network access point according to the access point status information of the at least one available network access point. For example, access point determining module 430 determines, by comparing the access point status information of the at least one available network access point, the available network access point having a best access quality as the target access point.

The identification submission module 440 is configured to submit the identification information of the target access point to a network access server.

The access account obtaining module 450 is configured to receive access account information returned by the network access server according to the submitted identification information of the target access point.

Specifically, the network access server collects access account information of multiple network access points in advance, and stores the collected access account information and the identification information of the corresponding access points in an associated manner. After receiving the identification information of the target access point submitted by the network terminal, the network access server may search, according to the identification information of the target access point, the access account information corresponding to the network access points, and return the access account information to the access account obtaining module 450 of the network terminal. For example, the access account information may include an access account (for example, a user name) and corresponding access verification information (for example, a login password). In some exemplary embodiments, the access account information may alternatively include only a login password corresponding to the target access point.

The network access module 460 is configured to send a wireless network access request to the target access point by using the access account information.

In some exemplary embodiments, the network access module 460 may send, according to access account information obtained by the network access server, to the target access point, a wireless network access request including the access account information. After receiving the wireless network access request, the target access point verifies whether the access account information carried in the request is legal. If yes, the target access point allows a network terminal where the network terminal is located to access a network by using the target access point. If no, the target access point denies access In some exemplary embodiments, the network access module 460 may access a login page corresponding to the target access point, and submit the access account information obtained from the network access server to the target access point by using the login page. After receiving the wireless network access request, the target access point verifies whether the access account information included in the request is legal. If yes, the target access point allows a network terminal where the network terminal is located to access a network by using the target access point. If no, the target access point denies access.

Further, in some exemplary embodiments, the network terminal may further include:

an access point display module 470, configured to display information about the available network access point, where the information about the available network access point includes the identification information of the at least one available network access point and the corresponding access point status information.

In the exemplary embodiment shown in FIG. 6, the access point display module 470 may display the found available network access point to a user in a form of collections or a list, and simultaneously display the access point status information of each available network access point, to facilitate the user's understanding of access quality of surrounding available network access point.

In some exemplary embodiments, the access point display module 470 may sort a display order of one or more available network access points according to the access point status information of the available network access points, and display an available network access point in order of better network quality, so that the user may easily and rapidly select the available network access point having the best access quality as the target access point. In some exemplary embodiments, the network terminal may set weight values corresponding to one or more of the wireless network access signal strength, the network speed, and/or the distance, and determine, according to the wireless network access signal strength, the network speed, and/or the distance and their corresponding weight values, an access quality reference value of each available network access point. The access point display module 470 may determine an available network access point having better access quality by comparing the access quality reference values of each of the available network access points. In some exemplary embodiments, the network terminal may set an access quality parameter threshold, to exclude some network access points that do not satisfy the quality parameter threshold before determining the target access point. For example, the network terminal may set one or more of a wireless network access signal strength threshold, a network speed threshold, and/or a distance threshold, so that the network terminal reduces a number of the available network access points, and the access point display module 470 displays information about the reduced number of available network access points.

In some exemplary embodiments, the network terminal may further include:

a network terminal positioning module 480, configured to obtain current location information of the network terminal. For example, the network terminal positioning module 480 may obtain the current location information of the network terminal by using a built-in positioning module (for example, GPS).

In some exemplary embodiments, the network terminal may further include an access point distance obtaining module 490, configured to obtain, according to the identification information of the available network access point, the location information that is prestored by the network access server and that corresponds to the available network access point, and obtain the distance between the network terminal and the available network access point.

During specific implementation, the access point distance obtaining module 490 may obtain, according to the identification information of the available network access point, the location information that is prestored by the network access server and that corresponds to the available network access point, and determine the distance between the network terminal and the available network access point based on the prestored location information. For example, the access point distance obtaining module 490 may send the identification information of the network access point to the network access server. The network access server may search, according to the identification information, the prestored location information of each network access point for the location information corresponding the network access point, and return the location information to the access point distance obtaining module 490. The access point distance obtaining module 490 may calculate a distance between the network terminal where the access point distance obtaining module 490 is located and the network access point with reference to the location information of the network terminal. For another example, the access point distance obtaining module 490 may send a distance information request to the network access server. The request may include the location information of the network terminal where the access point distance obtaining module 490 is located and the identification information of the available network access point. The network access server searches, according to the identification information, the prestored location information of each network access point for the location information corresponding the network access point, determines a distance between the network terminal and the available network access point based on the location information of the network terminal and the prestored location information, and returns the distance to the access point distance obtaining module 490.

According to an exemplary embodiment, the wireless network access method according to FIG. 2 to FIG. 5 may be a man-machine interaction method performed by each module in the network terminal shown in FIG. 6. For example, operation S101, operation S102, operation S103, operation S104, operation S105, and operation S106 that are shown in FIG. 2 may be performed by the identification information obtaining module 410, the status information obtaining module 420, the access point determining module 430, the identification submission module 440, the access account obtaining module 450, and the network access module 460, respectively, that are shown in FIG. 6. Operation S201, operation S202, operation S203, operation S204, operation S205, and operation S206 that are shown in FIG. 3 may be performed by the identification information obtaining module 410, the status information obtaining module 420, the access point determining module 430, the identification submission module 440, the access account obtaining module 450, and the network access module 460, respectively, that are shown in FIG. 6. Operation S301, operation S302, operation S303, operation S304, operation S305, operation S306, and operation S307 that are shown in FIG. 4 may be performed by the identification information obtaining module 410, the status information obtaining module 420, the access point display module 470, the access point determining module 430, the identification submission module 440, the access account obtaining module 450, and the network access module 460, respectively, that are shown in FIG. 6. Operation S401, operation S402, operation S403, operation S404, and operation S407 that are shown in FIG. 5 may be performed by the identification information obtaining module 410, the status information obtaining module 420, the access point determining module 430, the identification submission module 440, and the network access module 460, respectively, that are shown in FIG. 6.

According to another exemplary embodiment, each module in the network terminal shown in FIG. 6 may be combined into one or more modules. In some exemplary embodiments, all of the modules in the network terminal shown in FIG. 6 may be combined into a single module. Alternatively, in some exemplary embodiments, one or more modules in the network terminal of FIG. 6 may be further disassembled into multiple modules having smaller functions. The modules are divided based on logical functions. During actual application, a function of one module may be achieved by using multiple modules, or a function of multiple modules may be achieved by using one module. In another exemplary embodiment, a network terminal device may further include one or more additional modules. In such a case, during actual applications, the functions may be achieved in cooperation with the one or more additional modules, and may be achieved by multiple modules in cooperation.

According to some exemplary embodiment, computer programs (including program code) capable of performing the wireless network access method shown in FIG. 2 to FIG. 5 may be executed on a general-purpose computing device including processing elements such as a central processing unit (CPU), a random access memory (RAM) and a read-only memory (ROM) and a storage element, for example a computer, to form the network terminal shown in FIG. 6, and to implement the wireless network access method according to the exemplary embodiments described above. That is, the modules described in FIG. 6 may be provided as computer programs or computer program code for execution by the CPU in conjunction with the RAM and/or the ROM. For example, the computer programs may be recorded on a computer readable recording medium, be loaded in the computing device by using the computer readable recording medium, and run in the computing device.

According to some exemplary embodiments, the network terminal may obtain access point status information of each available network access point that is currently found, determine a target access point from the at least one available network access point, and obtain access account information of the target access point from the network access server, to implement rapid network access.

Figure 7:
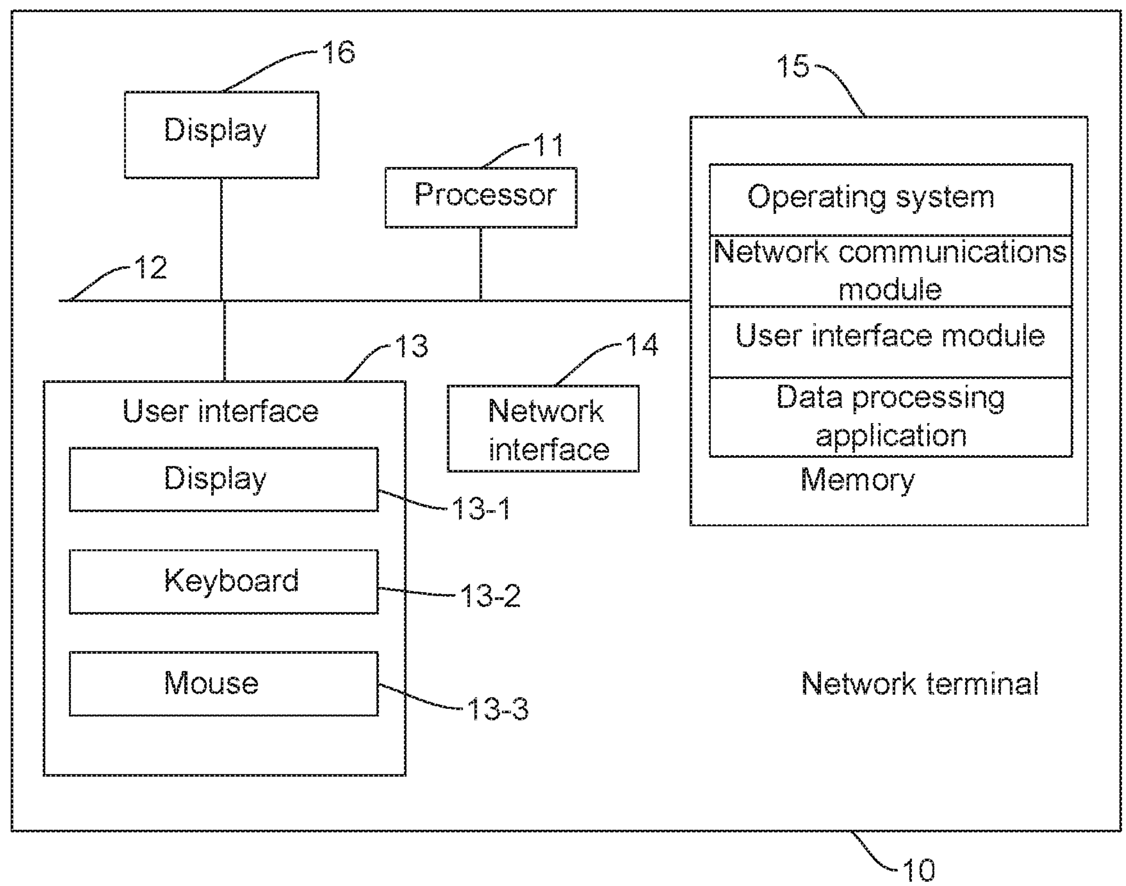
FIG. 7 is a schematic structural diagram of a network terminal according to another exemplary embodiment.

Referring to FIG. 7, FIG. 7 is a schematic structural diagram of a network terminal according to another exemplary embodiment. As shown in FIG. 7, the network terminal includes a processor 11, for example, a central processing unit (CPU), a network interface 14, a user interface 13, a memory 15, and a communications bus 12. The communications bus 12 is configured to implement communication connections between the components. The user interface 13 may include a display and/or a keyboard. The user interface 13 may further include a wired interface and/or a wireless interface. The network interface 14 may include a wired interface and/or a wireless interface (for example, a WI-FI interface and/or a Bluetooth interface). In some exemplary embodiments, a plurality of network interfaces 14 may be provided, each corresponding to a different communications protocol. The memory 15 may include a high-speed random access memory (RAM), and/or a non-volatile memory (non-volatile memory), such as a magnetic disk memory. The memory 15 may also include a storage apparatus external to the processor 101. As shown in FIG. 7, as a computer storage medium, the memory 15 may include an operating system, a network communications module, a user interface module, and a data processing application (APP).

The processor 11 may be configured to invoke the data processing APP or program code stored in the memory 15, in order to perform the following operations:

obtaining identification information of at least one available network access point according to a wireless network access signal that is currently found;

obtaining access point status information of each available network access point:

determining a target access point from the at least one available network access point according to the access point status information of the available network access point;

submitting the identification information of the target access point to a network access server;

receiving access account information returned by the network access server according to the identification information of the target access point; and sending a wireless network access request to the target access point by using the access account information.

The processor 11 may be one or more microprocessors or central processing units (CPUs). The processor 11 may invoke the data processing APP or program code stored in the memory 15 to perform the operation of determining a target access point from the at least one available network access point according to the access point status information of the available network access point, including:

determining, by comparing the access point status information of the at least one available network access point, an available network access point having the best access quality as the target access point.

The processor 11 may invoke the data processing APP or program code stored in the memory 15 to perform the operation of determining a target access point from the at least one available network access point according to the access point status information of the available network access point, including:

displaying information about the available network access point, where the information about the available network access point includes the identification information of the at least one available network access point and the corresponding access point status information; and determining the target access point from the at least one available network access point according to an access point selection instruction entered by a user.

The processor 11 may invoke the data processing APP or program code stored in the memory 15 to perform the operation of displaying information about the available network access point, including:

sorting a display order of the at least one available network access point according to the access point status information of the available network access point.

The access point status information of the available network access point may include:

a wireless network access signal strength, a network speed, and/or a distance between a network terminal and the available network access point.

The processor 11 may be configured to invoke the data processing APP or program code stored in the memory 15, and further perform the following operations:

obtaining current location information of the network terminal;

obtaining, according to the identification information of the available network access point, the location information that is prestored by the network access server and that corresponds to the available network access point; and obtaining the distance between the network terminal and the available network access point according to the current location information and the prestored location information.

The access account information includes an access account and corresponding access verification information.

A person of ordinary skill in the art may understand that the whole or parts of the process in the method of the exemplary embodiments may be configured by using computer program instruction related hardware. The programs may be stored in a computer readable storage medium. The programs corresponding to the modules of the network terminal shown in FIG. 6 may be stored in a readable storage medium of the network terminal, and be executed by at least one microprocessor of the network terminal, to implement the wireless network access method. The method includes the processes described in each embodiment shown in FIG. 2 to FIG. 5. The storage medium may be: a magnetic disk, an optical disc, a read-only memory (ROM), a random access memory (RAM), or the like.

The logic and/or operations shown in the flowcharts or described in another manner herein may be, for example, understood as a sequencing list of executable instructions used for implementing logical functions, implemented in any computer readable medium, to be provided for use in an instruction execution system, apparatus, or device (for example, a computer-based system, a system including a processor, or another system that can take an instruction from the instruction execution system, apparatus, or device and that can execute the instruction), or may be used in combination with the instruction execution system, apparatus, or device. For this specification, "the computer readable medium" may be an apparatus that can include, store, communicate, propagate, or transmit programs for use by the instruction execution system, apparatus, or device or for use in combination with the instruction execution system, apparatus, or device. A more specific example (a non-exhaustive list) of the computer readable medium includes the following: an electrical connection part (electronic apparatus) having one or more wirings, a portable computer hardware box (magnetic apparatus), a random access memory, a read-only memory, an erasable programmable read-only memory (EPROM or flash memory), an optical apparatus, and a portable compact disk read-only memory (CDROM). In addition, the computer readable medium may even be paper or another appropriate medium on which the programs may be printed, as the programs may be obtained electronically through scanning optically the paper or the another appropriate medium and then compiling, interpreting, or processing in another appropriate manner, as necessary, and then the programs are stored in the computer memory.

It should be understood that, each part of this application may be implemented by using hardware, software, firmware or a combination thereof. In the foregoing exemplary embodiments, multiple operations or methods may be implemented by software or firmware that is stored in the memory and that is performed by an appropriate instruction execution system. For example, if an exemplary embodiment is implemented by hardware, the exemplary embodiment may be implemented by any one of the following technologies known in the art or a combination thereof as in another implementation manner a discrete logic circuit having a logic gate circuit that is configured to implement logic functions of data signals, an application-specific integrated circuit having a suitable combined logic gate circuit, a programmable gate array (PGA), a field programmable gate array (FPGA), and the like. The storage medium may be a read-only memory, a magnetic disk, an optical disk, or the like. Although the above shows and describes various exemplary embodiments, it may be understood that the foregoing embodiments are exemplary and are not to be construed as limiting of the present disclosure. A person of ordinary skill in the art may make variations, modification, replacement, or deformation to the foregoing exemplary embodiments within the scope of this disclosure, and any such variations, modifications, replacements or deformations are intended to be included in the scope of the claims.

What is claimed is:

1. A wireless network access method performed by a network terminal, the wireless network access method comprising:

obtaining, by at least one central processing unit (CPU), identification information of at least one network access point;

filtering, by the at least one CPU, the obtained identification information according to a black/white list and determining the at least one network access point as at least one available network access point, based on the filtering;

obtaining, by the at least one CPU, access point status information of each of the at least one available network access point;

determining, by the at least one CPU, a target access point from the at least one available network access point according to the access point status information;

submitting, by the at least one CPU, the identification information of the target access point to a network access server via a mobile communications network;

receiving, by the at least one CPU, access account information for the target access point from the network access server; and transmitting, by the at least one CPU, a wireless network access request including the received access account information, to the target access point, wherein the access point status information comprises a distance between the network terminal and the available network access point, and the target access point is determined based on the distance, and wherein the distance is determined by:

obtaining first location information of the network terminal;

obtaining, according to the identification information of the available network access point, second location information of the available network access point that is pre-stored by a network access server; and obtaining the distance between the network terminal and the available network access point based on the first location information and the second location information.

2. The wireless network access method according to claim 1, wherein the at least one available network access point comprises a plurality of available network access points and the access point status information comprises access quality information about an access quality of the available network access point, and the target access point is determined by comparing the access quality information of the plurality of available network access points and selecting an available network access point having best access quality as the target access point.

3. The wireless network access method according to claim 1, wherein determining the target access point comprises:

displaying the identification information of the at least one available network access point and the access point status information corresponding to the at least one available network access point; and determining the target access point according to a selection instruction entered by a user.

4. The wireless network access method according to claim 3, wherein the displaying comprises:

sorting of the identification information and access point status information into a display order; and displaying the identification information and access point status information of the at least one available network access point in the display order.

5. The wireless network access method according to claim 1, wherein the access point status information of each of at least one the available network access point comprises one or more of a wireless network access signal strength from the available network access point, or a network speed of the available network access point.

6. The wireless network access method according to claim 1, wherein the access account information comprises an access account and corresponding access verification information.

7. A network terminal comprising a memory that stores a plurality of modules and at least one central processing unit (CPU) configured to execute the plurality of modules, the plurality of modules including:

an identification information obtaining module, configured to obtain identification information of at least one network access point, and to filter the obtained identification information according to a black/white list and determining the at least one network access point as at least one available network access point, based on the filtering;

a status information obtaining module, configured to obtain access point status information of each of the at least one available network access point;

an access point determining module, configured to determine a target access point from the at least one available network access point according to the access point status information;

an identification submission module, configured to submit the identification information of the target access point to a network access server via a mobile communications network;

an access account obtaining module, configured to receive access account information for the target access point from the network access server; and a network access module, configured to transmit a wireless network access request including the received access account information, to the target access point, wherein the access point status information comprises a distance between the network terminal and the available network access point, and the target access point is determined based on the distance, and wherein the plurality of modules further comprises:

a network terminal positioning module, configured to obtain first location information of the network terminal; and an access point distance obtaining module, configured to obtain, according to the identification information of the available network access point, second location information of the available network access point that is pre-stored by a network access server, wherein the status information obtaining modules is further configured to obtain the distance between the network terminal and the available network access point based on the first location information and the second location information.

8. The network terminal according to claim 7, wherein the at least one available network access point comprises a plurality of available network access points and the access point status information comprises access quality information about an access quality of the available network access point, and the access point determining module is configured to determine the target access point by comparing the access quality information of the plurality of available network access points and selecting an available network access point having best access quality as the target access point.

9. The network terminal according to claim 7, wherein the plurality of modules further comprises:

an access point display module, configured to display the identification information of the at least one available network access point and the access point status information corresponding to the at least one available network access point, wherein the access point determining module is configured to determine the target access point according to a selection instruction entered by a user.

10. The network terminal according to claim 9, wherein the access point display module is further configured to:

sort the identification information and access point status information into a display order; and display the identification information and access point status information of the at least one available network access point in the display order.

11. The network terminal according to claim 7, wherein the access point status information of each of at least one the available network access point comprises one or more of a wireless network access signal strength from the available network access point, or a network speed of the available network access point.

12. The network terminal according to claim 7, wherein the access account information comprises an access account and corresponding access verification information.

13. A non-transitory computer readable medium storing program code which when executed by a computer causes the computer to execute a process comprising:

obtaining identification information of at least one network access point;

filtering the obtained identification information according to a black/white list and determining the at least one network access point as at least one available network access point, based on the filtering;

obtaining access point status information of each of the at least one available network access point;

determining a target access point from the at least one available network access point according to the access point status information;

submitting the identification information of the target access point to a network access server via a mobile communications network;

receiving access account information for the target access point from the network access server; and transmitting a wireless network access request including the received access account information, to the target access point, wherein the access point status information comprises a distance between the network terminal and the available network access point, and the target access point is determined according to the distance, and wherein the process comprises:

obtaining first location information of the network terminal;

obtaining, according to the identification information of the available network access point, second location information of the available network access point that is prestored by a network access server; and obtaining the distance between the network terminal and the available network access point based on the first location information and the second location information.

14. The network terminal according to claim 13, wherein the at least one available network access point comprises a plurality of available network access points and the access point status information comprises access quality information about an access quality of the available network access point, and the target access point is determined by comparing the access quality information of the plurality of available network access points and selecting an available network access point having best access quality as the target access point.

15. The network terminal according to claim 13, wherein the target access point is determined by:

displaying on a display the identification information of the at least one available network access point and the access point status information corresponding to the at least one available network access point, and the target access point is determined according to a selection instruction entered by a user.

16. The network terminal according to claim 15, wherein information is displayed by:

sorting the identification information and access point status information into a display order; and displaying the identification information and access point status information of the at least one available network access point in the display order.

17. The network terminal according to claim 13, wherein the access point status information of each of at least one the available network access point comprises one or more of a wireless network access signal strength from the available network access point, or a network speed of the available network access point.

18. A wireless network access method performed by a network terminal, the wireless network access method comprising:

obtaining, by at least one central processing unit (CPU), status information from one or more Wireless Fidelity (WiFi) access points within a wireless transmission range of the network terminal;

filtering, by the at least one CPU, the obtained status information according to a status threshold and confirming the one or more WiFi access points as available WiFi access points, based on the filtering;

obtaining access point status information of each of the at least one available WiFi access point selecting, by the at least one CPU, a target WiFi access point from the one or more WiFi access points that are confirmed, based on the status information and the access point status information;

transmitting, by the at least one CPU, identification information of the target WiFi access point to a network access server via a mobile communications network;

in response to transmitting the identification information, receiving, by the at least one CPU, access information for the target WiFi access point from the network access server; and accessing, by the at least one CPU, a WiFi network via the target WiFi access point using the access information, wherein the access point status information comprises a distance between the network terminal and the WiFi access point, and the target WiFi access point is selected based on the distance, and wherein the distance is obtained by:

obtaining first location information of the network terminal;

obtaining, according to the identification information of the target WiFi access point, second location information of the available network access point that is prestored by a network access server; and obtaining the distance between the network terminal and the available network access point based on the first location information and the second location information.

19. The wireless network access method according to claim 18, wherein the status information comprises access quality information about an access quality of the WiFi access point, and the WiFi access point having a best access quality is selected as the target WiFi access point based on the access quality information.

20. The wireless network access method according to claim 18, further comprising:

displaying each of the one or more WiFi access points together with the status information of the WiFi access point on a display of the network terminal, wherein the target WiFi access point is selected by a selection instruction entered to the network terminal by a user.

21. The wireless network access method according to claim 20, wherein the one or more WiFi access points are displayed on the display in a display order based on the status information.

22. The wireless network access method according to claim 18, wherein the status information of each of the one or more WiFi access points comprises one or more of a signal strength of the WiFi access point at the network terminal, or a network speed of the WiFi access point.

* * * * *